Dec. 6, 1966  J. W. LINDSEY  3,289,237
VEHICLE ROADLIGHT WIPER
Filed June 14, 1965  2 Sheets-Sheet 1

INVENTOR
JOHN W. LINDSEY
BY
J. R. Harris
his ATTORNEY

Dec. 6, 1966          J. W. LINDSEY          3,289,237
VEHICLE ROADLIGHT WIPER
Filed June 14, 1965                    2 Sheets-Sheet 2

INVENTOR.
JOHN W. LINDSEY
BY
his ATTORNEY

United States Patent Office 3,289,237
Patented Dec. 6, 1966

3,289,237
VEHICLE ROADLIGHT WIPER
John W. Lindsey, 1058 Summer Place, Mount Lebanon Township, Allegheny County, Pa.
Filed June 14, 1965, Ser. No. 463,554
10 Claims. (Cl. 15—250.24)

This invention relates to wiper apparatus for the exterior of a lens or other transparency which protects a light or other element. It is more particularly concerned with wiper apparatus for a vehicle roadlight such as an automobile headlight.

An object of my invention is to provide apparatus for wiping road spatter from automobile headlights. Another object is to provide apparatus adapted to wipe a pair of headlights arranged in juxtaposition. Another object is to provide apparatus for wiping headlights of the sealed beam type. Still another object is to provide apparatus adapted to wipe a lens or other transparency positioned in front of sealed beam lights or other elements. Other objects of my invention will appear in the course of the description thereof which follows.

Figure 1:
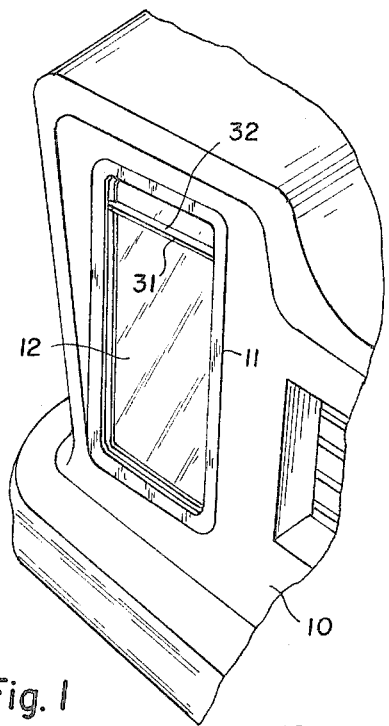
Figure 2:
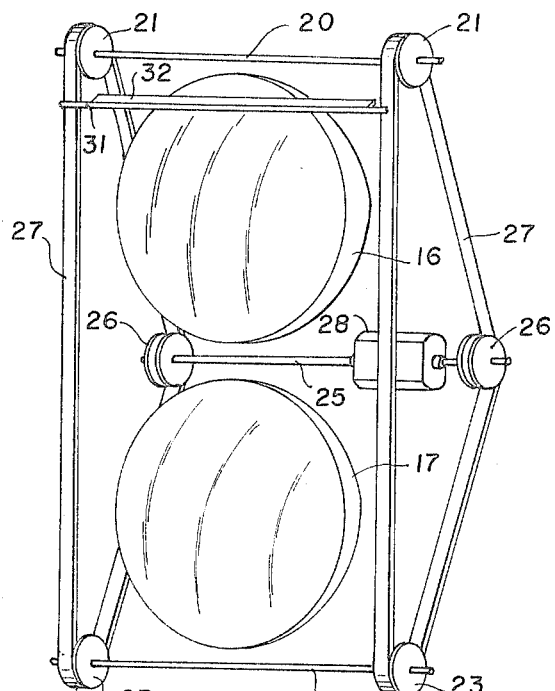
Figure 4:
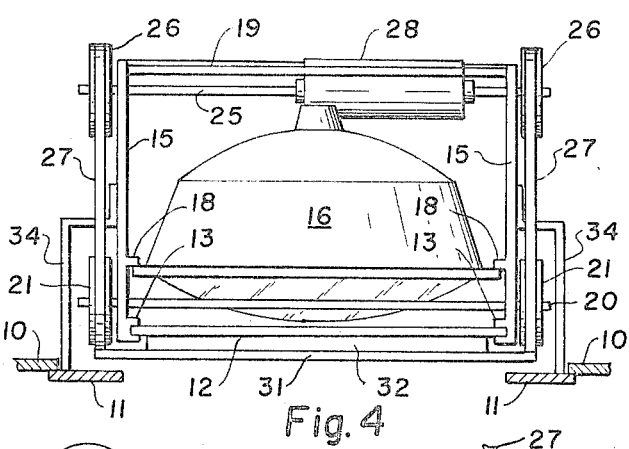
Figures 5, 6:
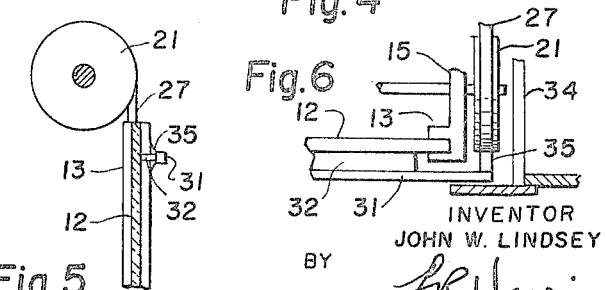
Figure 7:
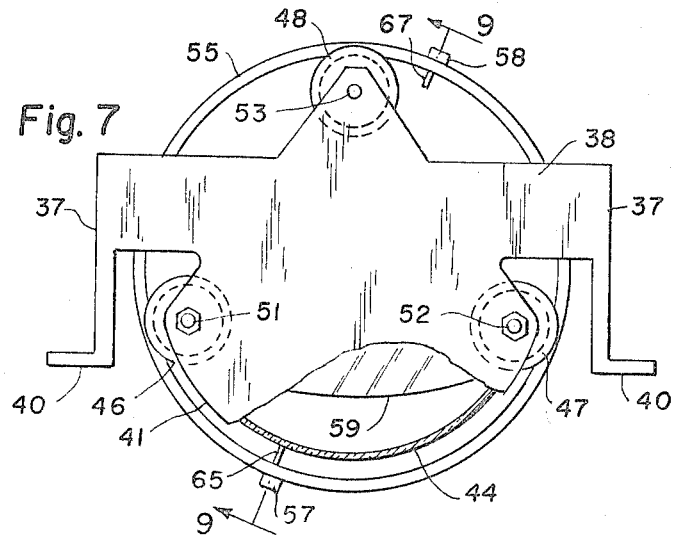
Figure 9:
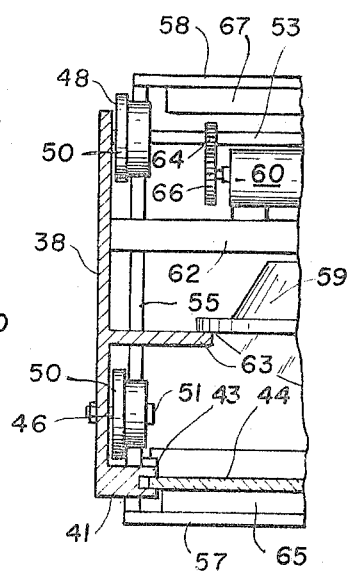
Figure 8:
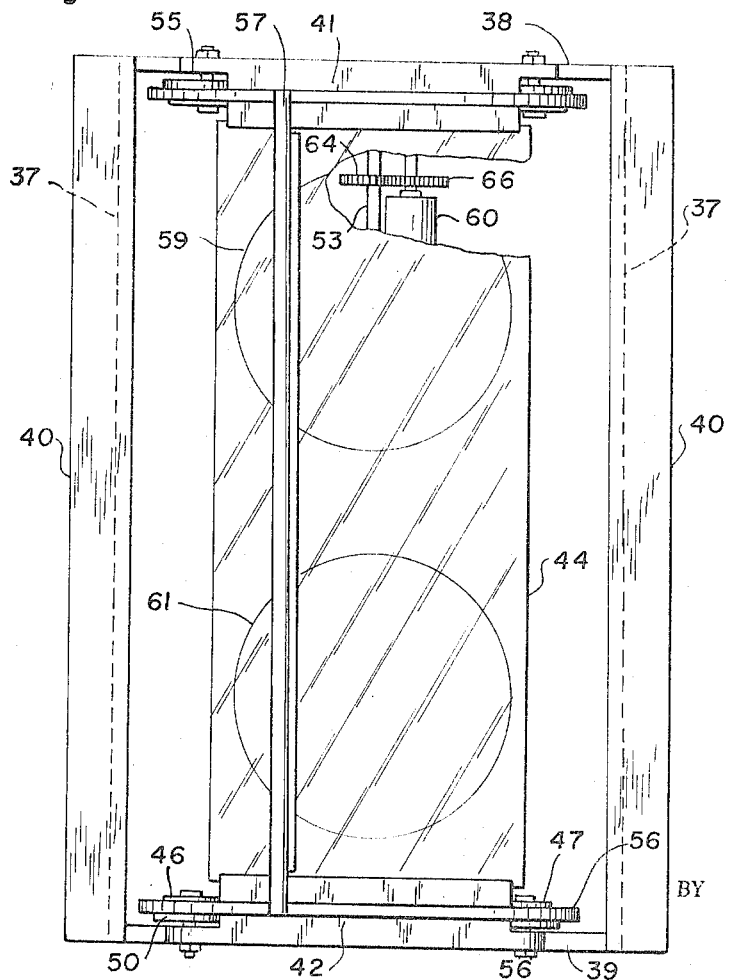

Embodiments of my invention presently preferred by me are illustrated in the attached figures to which reference is now made. FIGURE 1 illustrates in perspective a portion of an automobile body equipped with apparatus of my invention. FIGURE 2 is a schematic view in perspective of the wiper apparatus of my invention associated with a pair of sealed beam lights. FIGUURE 3 is a side elevation of apparatus of my invention. FIGURE 4 is a plan of the apparatus of FIGURE 3. FIGURE 5 is a fragmentary side elevation partly in section, and FIGURE 6 is a fragmentary plan of a slightly modified version of the apparatus of FIGURES 3 and 4. FIGURE 7 is a plan of a second embodiment of my invention. FIGURE 8 is a front elevation of that embodiment, and FIGURE 9 is a fragmentary elevation in section taken on the plane 9—9 of FIGURE 7.

In FIGURE 1 the car body panel 10 is cut out to provide a rectangular opening in which is fitted rectangular frame 11 to which are attached the high and low beam light units as well as the wiper apparatus of my invention, as will be described. From FIGURE 4 it may be seen that parallel side members 15—15 joined at their rear ends by cross brace 19 form a framework open in the front. Opposite internal flanges 18—18 on side members 15—15 positioned intermediate the front and rear of those members provide attachments for sealed beam units 16 and 17, one positioned above the other. Unit 16 is the conventional sealed high beam unit while unit 17 is the conventional sealed low beam unit. The front edges of side members 15—15 terminate in inwardly opening channels 13—13 which hold in place a transparent glass panel 12 just in front of seal beam units 16 and 17.

Above sealed beam unit 16 is positioned a horizontal shaft 20 journaled at each end in side members 15—15 and extending through those members. To each end of shaft 20 is fastened a pulley 21. Shaft 20 is positioned so that pulleys 21—21 extend slightly beyond the front edges of channels 13—13. Below sealed beam unit 17 is positioned a horizontal shaft 22 journaled in side members 15—15 in the same manner as shaft 20. To each end of shaft 22 is fastened a pulley 23 which is vertically aligned with pulley 21 above it. Between sealed beam units 16 and 17 and behind them is positioned an electric motor 28 having a shaft 25 extending from both ends. Motor 28 is supported by brace 19 and each outer end of shaft 25 is journaled in a side member 15 and extends therethrough. To the outer ends of shaft 25 are attached pulleys 26—26, each aligned with its corresponding pulleys 21 and 23. Around the pulleys 21, 23, and 26 on each side of my apparatus is trained a belt 27.

Figure 3:
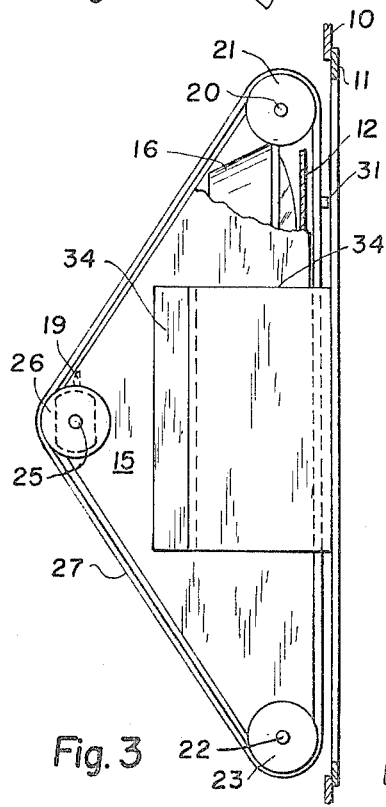

Each set of pulleys 21, 23, and 26 lies in a plane at the vertices of a triangle, as may be seen from FIGURES 2 and 3. The vertices of the triangle occupied by pulleys 21 and 23 are adjacent to and behind glass panel 12. The vertex occupied by pulley 26 is between sealed beam units 16 and 17 and behind both of them. Pulleys 21—21 and 23—23 are spaced with respect to glass panel 12 so that between them the belts 27—27 travel parallel to panel 12.

Attached to the outer surface of each belt 27 is an end of a cross bar 31 spaced outwardly from glass panel 12, and attached to bar 31 is a squeegee 32 which bears against the outside surface of glass panel 12 when bar 31 is in front of that panel. Pulleys 26—26 are positioned behind sealed bean units 16 and 17 a distance sufficient to permit squeegee 32 to clear those units when it is in back of them.

Side members 15—15 are attached to frame 11 by Z members 34—34 which clear pulleys 21—21 and 23—23 and extend through the loops of belts 27—27. Frame 11 overlaps the cutout in the body panel 10 so that the assembly including both headlight units and my wiping mechanism may be installed and removed from the front of the car in the same manner as a conventional sealed beam headlight unit. I do not describe or illustrate means for fastening this assembly in place, means for inserting or removing the glass panel 12 or means for focusing the sealed beam units 16 and 17 as all these means are conventional and are well known to those skilled in the art.

FIGURES 5 and 6 illustrate a modification of my invention previously described in which belts 27—27 travel parallel to glass panel 12 as before, but behind the plane of its outer surface. This arrangement is obtained by moving pulleys 21—21 and 23—23 back so that they do not extend beyond the outside face of panel 12. Cross bar 31 is fastened at each end to a belt 27 by a spacer element 35 which positions it in front of glass panel 12 in the same manner as has previously been described. The other reference characters of FIGURES 5 and 6 identify the same elements as they do in FIGURES 1 through 4.

The operation of my apparatus above-described will be understood from the figures and the foregoing description. Motor 28 causes shaft 25 and pulleys 26—26 fastened thereto to rotate. Each belt 27 is thereby caused to travel around the loop defined by pulleys 21, 23, and 26, and the belts 27—27 carry bar 31 and squeegee 32 with them. When these latter elements travel in front of glass panel 12, squeegee 32 wipes panel 12 clear of moisture and road spatter. Normally squeegee 32 is caused to travel down panel 12 from top to bottom, then around pulleys 23—23, up and back of sealed beam unit 17, over pulleys 26—26, up and back of sealed beam unit 16, over pulleys 21—21 and, down again over panel 12. When glass panel 12 is cleaned, motor 28 is stopped with squeegee 32 clear of this panel.

It will be understood that pulleys 21—21, 23—23, and 26—26 may be replaced by sprockets or gears, and belts 27—27 may be replaced by chains or timing belts, respectively, if desired. It is not necessary to use three pulleys for each belt. Four pulleys may be used, or, if space permits, pulleys 21—21 and 23—23 may be made large enough that they cause bar 31 and squeegee 32 on their return flight to clear units 16 and 17.

The embodiment of my invention illustrated in FIGURES 7, 8, and 9 is suitable for roadlights having lenses which are elements of cylinders or which are positioned behind transparencies so shaped. For convenience I refer to such lenses or transparencies as arcuate, it being understood that that term describes the lens or transparency cross-section. The mechanism is affixed to a frame comprising a pair of spaced upright side members 37—37 joined at their upper ends by a flat top plate 38 and at their bottom ends by a flat bottom plate 39. Each side member is provided with an outwardly turned flange 40 which is used to attach the frame and mechanism to be described to the automobile body in a suitable opening. The front rim 41 of top plate 38 and the front rim 42 of bottom plate 39 are identical. Front rim 41 extends downwardly and is formed with a channel 43 in its bottom face which holds the top edge of arcuate glass panel 44. Front rim 42 of bottom plate 39 is similarly constructed and holds the bottom edge of panel 44.

Attached to the bottom surface of top plate 38 are three pulleys or rollers 46, 47, and 48. Pulleys 46 and 47 are symmetrically spaced adjacent flanges 40—40 respectively and pulley 48 is symmetrically spaced behind pulleys 46 and 47. The three pulleys are positioned so that their circumferences are tangent to a circumscribed circle. Each pulley is formed with an outwardly projecting flange 50 at its upper end. Pulleys 46 and 47 are pivoted on stub shafts 51 and 52, respectively, and pulley 48 is fixed on a vertical shaft 53 the upper and lower ends of which are journaled in plates 38 and 39 respectively. Bottom plate 39 is likewise provided on its upper surface with three pulleys or rollers 46, 47, and 48, each aligned vertically with its like-numbered pulley previously described and identical therewith except that each has an outwardly projecting flange 50 at its lower end. Bottom pulley 48, not shown, is attached to the lower end of shaft 53 so that rotation of that shaft brings about rotation of both pulleys 48—48.

Circumscribing upper pulleys 46, 47, and 48 is an upper rigid ring 55 and circumscribing lower pulleys 46, 47, and 48 is a lower rigid ring 56. Rings 55 and 56 are spaced one from the other by diametrically opposite vertical bars 57–58 respectively and with those bars form a cage which is rotatable as a unit about the axis of the rings on the respective pairs of pulleys 46—46, 47—47, and 48—48. The arc of glass panel 44 is concentric with rings 55 and 56 and the rings extend beyond the convex face of panel 44.

Behind panel 44 and within the cage formed by rings 55 and 56 and the bars 57 and 58 are upper and lower beam headlight units 59 and 61 respectively, one positioned above the other, and a motor 60 which drives shaft 53. Upper headlight unit 59 is attached to flange member 63 which depends from upper plate 38 and lower headlight unit 61 is attached to lower plate 39 in like fashion. A vertical brace 62 fastened at its top to upper plate 38 and at its bottom to lower plate 39 supports motor 60, the driving pulley 66 of which frictionally engages a like pulley 64 affixed to shaft 53.

The inner face of bar 57 is provided with a rubber squeegee 65 and the inner face of bar 58 is provided with a squeegee 67, the squeegee being dimensioned to bear against the convex face of glass panel 44 when they are in contact with it.

The operation of this embodiment of my invention described immediately above is similar to the operation of the embodiment first described. Motor 60 rotates shaft 53 and pulleys 48—48 attached to each end of it. The rotation of those pulleys causes rings 55 and 56 to rotate about their common axis carrying oppositely disposed squeegees 65 and 67 with them. Each of those squeegees when it comes in contact with arcuate glass panel 44 wipes it clean from one side to the other and continues to move around back of light units 59 and 61 and motor 60 until it again engages panel 44.

Although my apparatus has been described and illustrated as being adapted to a pair of headlight units positioned one above the other, it is equally well adapted to a pair of lights positioned side-by-side, or to a single unit. The squeegee 32 may be made to travel vertically across a lens or protective panel 12, or horizontally. It is not necessary to my invention that the light units be positioned behind a flat glass panel. The contour of squeegee 32 can be adapted to a curved glass surface, or to the lens surface of the light unit or units directly without any interposed transparency if the lens surface is set flush with the surrounding body surface. The units or elements behind the transparency or protective panel need not be light sources; they can be any units or elements from which or to which light must pass through the transparency.

I claim:

1. Wiper apparatus for a transparency positioned before a light source comprising a carrier movable in a closed path around the light source, means causing the carrier to move in its path, a wiper attached to the carrier, and means defining the path of the carrier so that its movement causes the wiper to pass over the outside surface of the transparency and in back of the light source as the carrier moves in its path.

2. Apparatus of claim 1 in which the means defining the path of the carrier comprise three pulleys lying in the same plane at the vertices of a triangle, two of the vertices being adjacent the transparency and the third behind the light source.

3. Apparatus of claim 1 including supporting means for the transparency extending from one side thereof through the closed path.

4. Apparatus of claim 1 in which the carrier is an endless belt.

5. Apparatus of claim 4 in which the means defining the path of the carrier are positioned to cause the endless belt to travel substantially parallel to the transparency, but behind its outside surface.

6. Apparatus of claim 1 in which the carrier is a rigid ring.

7. Apparatus of claim 6 in which the transparency is arcuate in cross section.

8. Apparatus of claim 6 in which the means defining the path of the carrier comprise a plurality of pulleys spaced around the ring and adapted to support it.

9. A vehicle headlight assembly comprising a pair of side plates, means spacing the side plates from each other, a light source supported by the side plates between them, a transparency supported by the side plates in front of the light source, a first pair of pulleys rotatably supported by the side plates above and on each side of a light source, a second pair of pulleys rotatably supported by the side plates below and on each side of the light source, a third pair of pulleys rotatably supported by the side plates behind and on each side of the light source, a pair of endless carriers each trained around the three pulleys on one side of the light source, an elongated wiper element attached at each end to an endless carrier and positioned to pass over the outside surface of the transparency and in back of the light source as the carriers travel around their pulleys, and means for causing the endless carriers to travel around their pulleys.

10. A vehicle headlight assembly comprising upper and lower end plates, means spacing the end plates from each other, a light source supported by the end plates between them, an arcuate transparency supported by the end plates in front of the light source, three pulleys rotatably supported tangent to a first circumscribed circle co-axial with the arc of the transparency by the upper end plate, three pulleys rotatably supported tangent to a second circumscribed circle co-axial with the first circumscribed circle by the lower end plate, a first rigid ring circumscribing the three pulleys on the upper end plate, a second rigid ring circumscribing the three pulleys on the lower end plate, an elongated wiper element attached at one end to the first rigid ring and at the other end to the second rigid ring and positioned to pass over the outside surface of the transparency and in back of the light source as the rings travel around their pulleys and means for causing the rings to travel around their pulleys.

No references cited.

CHARLES A. WILLMUTH, *Primary Examiner.*